United States Patent Office 3,219,663
Patented Nov. 23, 1965

3,219,663
SODIUM THIOSULFATE DERIVATIVE OF CEPHALOSPORIN C
Arnold L. Demain, Westfield, N.J., assignor to Merck & Co., Inc., Rahway, N.J., a corporation of New Jersey
No Drawing. Filed May 28, 1962, Ser. No. 197,923
1 Claim. (Cl. 260—243)

This invention relates to microbiological production of cephalosporin C and its derivatives and, more particularly, it relates to the production of cephalosporin C antibiotics having enhanced activity against gram-negative organisms.

The antibiotic substance cephalosporin C and its preparation by fermentation of a suitable species of cephalosporium have been described in the art. The antibiotic is active against both gram-negative and gram-positive bacteria. Since cephalosporin C itself is only moderately active, it has been the object of considerable research to provide cephalosporin C derivatives which have enhanced activity. Such derivatives include esters, amides, heterocyclic bases, N-acylated cephalosporin C derivatives, 7-aminocephalosporanic acid, acyl and aminoacyl esters of 7-aminocephalosporanic acid, and hydantoin and acylated hydantoin derivatives of cephalosporin C.

Accordingly, it is an object of the present invention to provide cephalosporin antibiotics having enhanced antibiotic activity.

A more specific object of the present invention is to provide cephalosporin C antibiotics having enhanced activity.

Another object of the invention is to provide a chemical method of converting cephalosporin C to a new antibiotic having enhanced activity.

These and other objects will be made apparent from the following more particular description of the invention in which reference will be made to several illustrative embodiments thereof.

In accordance with the foregoing objects of the invention, there is provided herein an improved cephalosporin antibiotic having enhanced activities.

These antibiotics are produced by reacting cephalosporin C with thiosulfate ion. In a preferred form of the invention, cephalosporin C is reacted with sodium thiosulfate in solution to produce an enhanced cephalosporin C antibiotic which has enhanced activity against gram-negative assay organisms than cephalosporin C itself.

In a typical run, a mixture containing 170 micrograms per ml. of cephalosporin C and 5 milligrams per ml. of sodium thiosulfate in 0.02 M phosphate buffer at pH 7 are shaken together for three days at 37° C. After incubation, the antibiotic solution thus produced shows an activity equivalent of 460 micrograms per ml. of cephalosporin C by *E. coli* W-208 assay, whereas cephalosporin C similarly treated without sodium thiosulfate shows an activity of less than 30 after a like period.

The optimum temperature of reaction is about 46° C., the reaction proceeding somewhat slower at temperatures above and below this temperature.

While the chemical structure of the antibiotic produced by the reaction of a cephalosporin C with thiosulfate according to the present invention is unknown at this time, its activity is quite stable to commercial penicillinase. The new antibiotic also shows a far greater degree of activity than cephalosporin C itself against the organisms *Proteus vulgaris*, *Klebsiella pneumoniae*, and *Salmonella schottmuelleri*, as well as against the aforementioned *E. coli* W-208.

What is claimed is:
The product formed by mixing cephalosporin C with sodium thiosulfate in a neutral aqueous solution.

References Cited by the Examiner
UNITED STATES PATENTS

| | | | |
|---|---|---|---|
| 3,117,126 | 1/1964 | Hoover et al. | 260—243 |
| 3,124,576 | 3/1964 | Stedman | 260—243 |
| 3,129,224 | 4/1964 | Collins | 260—243 |
| 3,157,648 | 11/1964 | Collins | 260—243 |
| 3,160,631 | 12/1964 | Peterson et al. | 260—243 |
| 3,167,549 | 1/1965 | Hoover | 260—243 |
| 3,167,550 | 1/1965 | Chow et al. | 260—243 |

OTHER REFERENCES
Morton, The Chemistry of Heterocyclic Compounds, page VI of the preface (1946).

NICHOLAS S. RIZZO, *Primary Examiner.*